US008764252B2

(12) United States Patent
Evans

(10) Patent No.: US 8,764,252 B2
(45) Date of Patent: Jul. 1, 2014

(54) PAN AND TILT SERVOMOTOR WITH BRAKE

(71) Applicant: Nigel Evans, Gloucestershire (GB)

(72) Inventor: Nigel Evans, Gloucestershire (GB)

(73) Assignee: Production Resource Group, LLC, New Windsor, NY (US)

( * ) Notice: Subject to any disclaimer, the term of this patent is extended or adjusted under 35 U.S.C. 154(b) by 0 days.

(21) Appl. No.: 14/011,149

(22) Filed: Aug. 27, 2013

(65) Prior Publication Data

US 2014/0009949 A1 Jan. 9, 2014

Related U.S. Application Data

(63) Continuation of application No. 12/493,915, filed on Jun. 29, 2009, now Pat. No. 8,517,577.

(60) Provisional application No. 61/076,756, filed on Jun. 30, 2008.

(51) Int. Cl.
*B60Q 1/06* (2006.01)

(52) U.S. Cl.
USPC ............ 362/386; 362/269; 362/271; 362/272

(58) Field of Classification Search
None
See application file for complete search history.

(56) References Cited

U.S. PATENT DOCUMENTS

| | | | | |
|---|---|---|---|---|
| 3,610,584 | A * | 10/1971 | Pfaff, Jr. | 362/403 |
| 3,644,728 | A | 2/1972 | Hessemer et al. | |
| 6,633,286 | B1 | 10/2003 | Do et al. | |
| 6,866,402 | B2 * | 3/2005 | Belliveau | 362/272 |

* cited by examiner

*Primary Examiner* — Sean Gramling
(74) *Attorney, Agent, or Firm* — Law Office of Scott C. Harris, Inc.

(57) ABSTRACT

A moving light which has an electronic brake that automatically engages when power is released, to prevent movement of a moving head of a light whenever the power is released.

11 Claims, 1 Drawing Sheet

PAN AND TILT SERVOMOTOR WITH BRAKE

This application is a continuation application of U.S. Ser. No. 12/493,915 filed Jun. 29, 2009, which claims priority from provisional application No. 61/076,756, filed Jun. 30, 2008, the entire disclosure of which is herewith incorporated by reference.

BACKGROUND

Stage lights often motorized and move in pan and tilt directions to point to a stage or the like. However, when being transported, or at other similar times, the lights may be put in a “stowed” position in which their motion axes are locked. Lights like this often use mechanical locks. Once locked, the light cannot be moved.

SUMMARY

The present application describes a system for automatic control of lock status of a locked light.

DETAILED DESCRIPTION

The inventors recognize a problem in the prior art. If a light is “locked” for transport, such that it cannot be moved, one can inadvertently forget to remove that lock before normal operation can begin. Lights are often transported to remote locations, then assembled to an installation, e.g., hung from a truss. The truss may then be lifted high off the ground. If the light is installed on a truss, while still locked, the light is useless until someone releases that lock. This may require a person to climb the truss and manually unlock the lock.

An embodiment describes an electronic brake on the light of a type that allows electrical deactuation.

Figure 1:
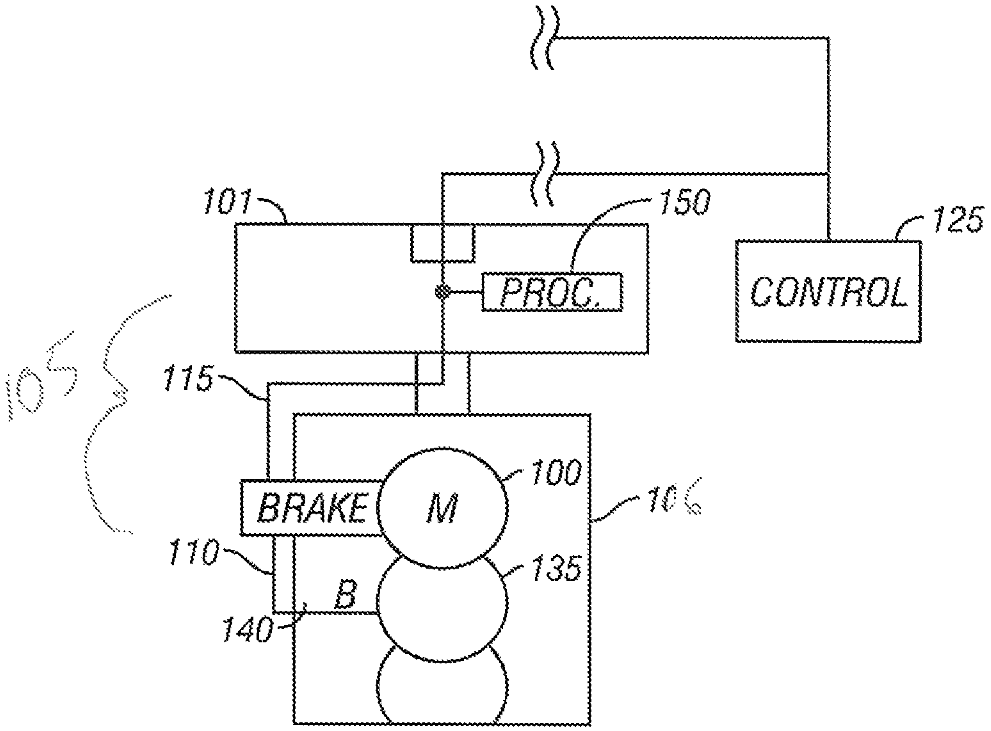
FIG. 1 shows a light system with a remotely controlled light and a brake.

FIG. 1 illustrates a light 105 that has a base 101 and a moving head 106 that is movable relative to the base. The base may be freestanding, or attached to one or more trusses.

Motor 100 is used to pan or tilt the head 106 of the moveable light 105. The motor includes an electric brake 110 on the motor, which be energized by an electrical braking signal 115. The light 100 can be a remotely controllable light, which receives commands over a link from a remote controller 125, and where that controller may serve to control many such lights. The controls can be DMX or Artnet, or Ethernet based control. In a first embodiment, when the brake is engaged, it can prevent the motor 100 from turning at all. The brake can be selectively actuated and deactuated. In the embodiment, the brake may be a safety style, electronically actuable brake, that automatically goes into braking mode whenever power is interrupted.

There may be a separate motor 135 with its own brake 140. The two motors respectively control the pan and tilt operation.

The motor is rigidly connected to the pan and tilt mechanism on the lights, in a way such that when the motor is stopped and braked, the light is completely prevented from further movement. The effect is that when the power to the light is turned off, the brake automatically engages. Therefore, whenever the light is off, the brake is on, and the moving light head is locked.

In an embodiment, the brake, once actuated, does not automatically release when power comes on. A software control is used to control the brake off. This may be accomplished by using a latching brake, that latches into the power off, i.e. brake engaged, state. A control signal is be sent to release the brake. That control line is automatically inactivated when the power is turned off. When the power is restored, that control line is controlled by a processor 150 and by a software control routine executed by the processor 150. Therefore the system also powers up in braked mode. In embodiments, the lights are remotely controlled lights, which are controlled based on commands from a remote console 125. The remote console 125 may provide the signal to release the brake. In one embodiment, that signal may be initially sent to each electronically-braked light on power up, as a power up reset signal. That signal is received by processor 150, and used to create the signal to the brake.

In another embodiment, the light itself may automatically power itself up and automatically release the brake, e.g., after 60 seconds of power up, by an internally-created signal that is automatically created by the processor 150.

In an embodiment, the brake current has two different levels, a first and momentary higher current level which is necessary to open the brake 110, 140 from its locked position, and a second lower steady state current to maintain the brake in the off, non-braked, state without overheating the brake.

Figure 2:
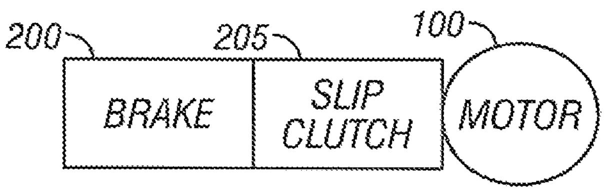
FIG. 2 shows a second embodiment with a clutch between the motor and brake.

The second embodiment illustrated in FIG. 2 includes a brake assembly 200 that includes a clutch 205 that will slip when the light receives force by more than a certain amount of force. That amount of force may be the amount of force that it takes to otherwise damage the light or the materials. This embodiment still locks the light, but prevents damage to the light if someone tries to force the light into another position when locked.

The clutch 205 also allows an operator to manually move the head to any desired position for servicing or other work where it will be held stationary by the brake 200. Also, use of the clutch 205 allows the light to be moved enough to fit into whatever transportation container might be used, while still keeping the light in the locked position.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the system is intended to be used on a stage light, e.g., one which outputs more than 500 watts of light and is remotely controllable to pointing directions based on commands to pan and tilt the light. It can alternatively be used with other kinds of lights, e.g. intensity controlled lights only.

The brake can also be manually disengaged, e.g., for testing and the like.

In lights that are remotely controlled, the system can automatically check whether the brake is on before accepting remote commands. For example, sending a command to ‘move” while the brake is on can cause a fault that lights an error light, and prevents the light from trying to move.

Also, the inventors intend that only those claims which use the words “means for” are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A movable lamp, comprising:

a base that attaches to a supporting truss, said base having a processor;

a moving light head that includes a light and moves said light relative to the base based on a control that is received by said processor from a remote controller;

an electronic brake, which holds said moving light head relative to said base when a braking effect is engaged, said electronic brake being controlled into a braking effect state, and staying in said braking effect state, to prevent movement between said base and said moving light head, and said electronic brake removing said braking effect to allow free movement between said moving light head and said base, only by receiving a command in said processor from said remote controller, and not automatically removing said braking effect without receiving said command from said remote controller, wherein said brake requires a first level of current to maintain said brake in an off position, and requires a second level of current higher than said first level of current to remove said braking effect and put said brake into said off position.

2. A lamp as in claim 1, wherein said moving light head is movable in pan and tilt directions based on commands received in said processor from said remote controller.

3. A lamp as in claim 1, further comprising a motor that moves said moving light head.

4. The lamp as in claim 1, wherein said brake automatically goes into a braking effect when power is interrupted.

5. A lamp as in claim 3, further comprising a clutch between said brake and said moving light head, allowing movement of said moving light head when more than a certain amount of force is applied.

6. A method of operating a moving head lamp, comprising:

attaching a movable lamp that has a base and a moving light head to a supporting truss;

moving said moving light head relative to the base, based on a control that is received by a processor in said base from a remote controller;

braking between said moving light head and said base using an electronic brake, said braking comprising holding said moving light head relative to said base when a braking effect is engaged, said braking staying in said braking effect state once engaged and until released, and in said braking state, preventing movement between said base and said moving light head, and removing said braking effect only by receiving a command in said processor from said remote controller, and not automatically removing said braking effect without receiving said command from said remote controller , wherein said braking uses a first level of current to maintain said brake in an off position, and requires a second level of current higher than said first level of current to remove said braking effect and put said brake into said off position.

7. The method as in claim 6, wherein said moving comprises changing pan and tilt of the light.

8. The method as in claim 7, wherein said braking comprises separately braking pan direction and braking in tilt direction.

9. The method as in claim 6, further comprising clutching between said brake and said moving light head, which allows movement of the moving light head when force greater than a specified amount is applied.

10. A movable lamp, comprising:

a base that attaches to a supporting truss, said base having a processor;

a moving light head that includes a light, said moving light head being movable relative to said base in pan and tilt directions;

a motor, controlled responsive to said at least one signal received by the processor, that moves said moving light head relative to the base based on said at least one signal that is received by said processor from a remote controller;

an electronic brake, which holds said moving light head relative to said base when a braking effect is engaged, said electronic brake being controlled into a braking effect state, and staying in said braking effect state, to prevent movement between said base and said moving light head, and said electronic brake removing said braking effect to allow free movement between said moving light head and said base only by receiving a command in said processor from said remote controller, and not automatically removing said braking effect without receiving said command from said remote controller, wherein said electronic brake uses a first level of current to maintain said brake in an off position, and uses a second level of current higher than said first level of current to remove said braking effect.

11. A lamp as in claim 10, further comprising a clutch between said brake and said moving light head, allowing movement of said moving light head when more than a certain amount of force is applied.

* * * * *